United States Patent
Schrell

(10) Patent No.: US 10,556,701 B2
(45) Date of Patent: Feb. 11, 2020

(54) BIRD-STRIKE ENERGY ABSORBING NET

(71) Applicant: Rohr, Inc., Chula Vista, CA (US)

(72) Inventor: Johann Steven Schrell, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 298 days.

(21) Appl. No.: 15/488,279

(22) Filed: Apr. 14, 2017

(65) Prior Publication Data

US 2018/0297713 A1  Oct. 18, 2018

(51) Int. Cl.
*B64D 29/00* (2006.01)
*B64D 45/00* (2006.01)
*B64D 33/02* (2006.01)

(52) U.S. Cl.
CPC ............ *B64D 29/00* (2013.01); *B64D 33/02* (2013.01); *B64D 45/00* (2013.01); *B64D 2033/022* (2013.01); *B64D 2045/0095* (2013.01)

(58) Field of Classification Search
CPC ........ B64D 33/02; B64D 45/00; B64D 29/00; B64D 2033/022; B64D 2045/0095
USPC .............................................................. 415/9
See application file for complete search history.

(56) References Cited

U.S. PATENT DOCUMENTS

| | | | | |
|---|---|---|---|---|
| 3,871,844 | A * | 3/1975 | Calvin, Sr. ............ | B01D 45/08 55/306 |
| 4,618,026 | A * | 10/1986 | Olson .................... | A62B 35/04 182/4 |
| 4,895,491 | A * | 1/1990 | Cross .................... | F04D 29/388 244/123.9 |
| 5,174,410 | A | 12/1992 | Casebolt | |
| 5,411,224 | A * | 5/1995 | Dearman ............... | B64D 33/02 244/53 B |
| 5,598,900 | A * | 2/1997 | O'Rourke .......... | A62B 35/0056 182/18 |
| 6,138,950 | A * | 10/2000 | Wainfan ................ | B64D 33/02 244/53 B |
| 6,479,124 | B1 | 11/2002 | Porte et al. | |
| 6,533,066 | B1 * | 3/2003 | O'Dell .................... | A62B 35/04 182/3 |
| 7,625,415 | B2 * | 12/2009 | Durocher ............... | B01D 39/12 244/53 B |

(Continued)

FOREIGN PATENT DOCUMENTS

| DE | 20013249 U1 * | 1/2001 | ............. B64C 3/00 |
|---|---|---|---|
| EP | 2103330 | 1/2011 | |

OTHER PUBLICATIONS

Development and Validation of a Novel Bird Strike Resistant Composite Leading Edge Structure; Kermanidis, Labeas, Sunaric and Ubels.

*Primary Examiner* — Sizo B Vilakazi
*Assistant Examiner* — Brian R Kirby
(74) *Attorney, Agent, or Firm* — Snell & Wilmer, L.L.P.

(57) ABSTRACT

An energy absorbing arrangement may comprise an inner barrel comprising a centerline axis, an outer barrel, a webbing extending between the outer barrel and the inner barrel and configured to be offset from a nose lip by a distance, the webbing being folded together to form a plurality of folds, the plurality of folds being stitched together via a plurality of stitches, wherein the webbing is configured to absorb energy from an object in response to the object passing through the nose lip and applying a force to the webbing.

16 Claims, 6 Drawing Sheets

(56) References Cited

U.S. PATENT DOCUMENTS

| | | | | |
|---|---|---|---|---|
| 7,803,204 | B1* | 9/2010 | Mladinich | F02C 7/055 244/136 |
| 7,815,013 | B2 | 10/2010 | Griffith | |
| 8,123,167 | B2* | 2/2012 | Olmi | B64C 3/28 244/121 |
| 8,245,972 | B2* | 8/2012 | Capasso | B32B 3/12 244/123.1 |
| 8,322,657 | B2* | 12/2012 | West | B64C 3/26 244/123.1 |
| 8,356,691 | B2 | 1/2013 | Griffith | |
| 8,419,815 | B1* | 4/2013 | Moran | B64D 33/02 244/53 B |
| 8,528,864 | B2* | 9/2013 | Villanueva Montero | B64D 45/00 244/129.1 |
| 8,584,799 | B1* | 11/2013 | Dennington | A62B 35/04 182/3 |
| 8,657,895 | B2* | 2/2014 | Kline | F02C 7/055 55/306 |
| 8,701,826 | B2* | 4/2014 | Smith | F16F 7/006 182/3 |
| 8,746,619 | B2* | 6/2014 | Li | B64C 3/28 244/121 |
| 8,777,163 | B2* | 7/2014 | Safai | B64D 15/12 244/134 D |
| 8,876,930 | B2* | 11/2014 | Pavlatos | B01D 45/12 55/306 |
| 9,573,672 | B2* | 2/2017 | Dazet | B64C 3/28 |
| 9,708,030 | B1* | 7/2017 | Gabrys | B63B 1/244 |
| 2005/0218261 | A1* | 10/2005 | Porte | F01D 21/04 244/53 B |
| 2007/0272799 | A1* | 11/2007 | Verdan | B64C 3/28 244/123.6 |
| 2008/0179448 | A1* | 7/2008 | Layland | B64D 15/12 244/1 N |
| 2008/0265095 | A1* | 10/2008 | Lee | B63B 1/244 244/129.1 |
| 2009/0101760 | A1* | 4/2009 | Ghogomu | B64D 15/12 244/53 R |
| 2010/0260602 | A1* | 10/2010 | Binks | B64D 29/08 415/214.1 |
| 2011/0011055 | A1* | 1/2011 | Troy | F02C 7/055 60/39.092 |
| 2014/0352795 | A1* | 12/2014 | Kline | F02C 7/05 137/15.1 |
| 2015/0048207 | A1* | 2/2015 | Williams | B64C 3/00 244/123.7 |
| 2015/0314882 | A1* | 11/2015 | Lumbab | B64D 29/06 415/119 |
| 2016/0039528 | A1* | 2/2016 | Caruel | F02K 1/64 415/119 |
| 2016/0201482 | A1* | 7/2016 | Parkos, Jr. | F01D 5/288 416/224 |
| 2016/0312795 | A1* | 10/2016 | Crall | F01D 21/045 |
| 2016/0377090 | A1* | 12/2016 | Brown | F04D 29/526 415/9 |

* cited by examiner

BIRD-STRIKE ENERGY ABSORBING NET

FIELD

This disclosure relates generally to gas turbine engines, and more particularly to systems and methods for minimizing damage incurred for impact events to an aircraft nacelle.

BACKGROUND

Aircraft are susceptible to high velocity impact events with birds, or bird strikes. To reduce the damage and effects of impacts, certain parts or areas of aircraft are designed and/or sized to withstand such an impact event to assure safety of flight.

SUMMARY

An energy absorbing arrangement of an aircraft is disclosed herein, in accordance with various embodiments. The energy absorbing arrangement may comprise an inner barrel comprising a centerline axis, an outer barrel, and a webbing extending between the outer barrel and the inner barrel and configured to be offset from a nose lip by a distance, the webbing being folded together to form a plurality of folds, the plurality of folds being stitched together via a plurality of stitches, wherein the webbing is configured to absorb energy from an object in response to the object passing through the nose lip and applying a force to the webbing.

In various embodiments, the energy absorbing arrangement may further comprise a forward bulkhead extending between the inner barrel and the outer barrel, an aft bulkhead extending between the inner barrel and the outer barrel. At least one stitch of the plurality of stitches may break and at least one fold of the plurality of folds may be unfolded in response to the force being applied to the webbing. The force may comprise a tensile force. The distance may be greater than 1 centimeter (0.39 inches). The webbing may be configured to arrest the object in response to the object engaging the webbing. The webbing may comprise a reinforcement zone at an end of the webbing whereby the webbing is fastened to the outer barrel. The webbing may comprise an additional reinforcement zone at another end of the webbing whereby the webbing is fastened to the inner barrel. The energy absorbing arrangement may further comprise an arrester coupled to the webbing, and an additional webbing coupled to the arrester, the arrester being coupled between the webbing and the additional webbing, the webbing coupled to the outer barrel and the additional webbing coupled to the inner barrel, wherein the arrester is configured to arrest the object and at least one stitch of the plurality of stitches may be configured to break and at least one fold of the plurality of folds is unfolded in response to the force being applied to the webbing. The arrester may comprise at least one of a fabric net, a metal panel, and a composite panel.

A nacelle for an aircraft is disclosed herein, in accordance with various embodiments. The nacelle may comprise an inlet disposed forward of a fan case comprising an inner barrel comprising a centerline axis, an outer barrel, a nose lip extending between the inner barrel and the outer barrel, and an energy absorbing arrangement. The energy absorbing arrangement may comprise a webbing extending between the outer barrel and the inner barrel and offset from the nose lip by a distance, the webbing being folded together to form a plurality of folds, the plurality of folds being stitched together via a plurality of stitches, wherein the webbing is configured to absorb energy from an object in response to the object applying a force to the webbing.

In various embodiments, the nacelle may further comprise a forward bulkhead extending between the inner barrel and the outer barrel, an aft bulkhead extending between the inner barrel and the outer barrel. The at least one of the stitches may be configured to break and at least one of the folds may be configured to unfold in response to the force being applied to the webbing. The force may comprise a tensile force. The webbing may be configured to arrest the object in response to the object engaging the webbing. The webbing may comprise a reinforcement zone at an end of the webbing whereby the webbing is fastened to the outer barrel. The webbing may comprise an additional reinforcement zone at another end of the webbing whereby the webbing is fastened to the inner barrel. The energy absorbing arrangement may further comprise an arrester coupled to the webbing, and an additional webbing coupled to the arrester, the arrester being coupled between the webbing and the additional webbing, the webbing coupled to the outer barrel and the additional webbing coupled to the inner barrel, wherein the arrester is configured to arrest the object and at least one stitch of the plurality of stitches may be configured to break and at least one fold of the plurality of folds may be configured to unfold in response to the force being applied to the webbing.

An energy absorbing arrangement of an aircraft is disclosed herein, in accordance with various embodiments. The energy absorbing arrangement may comprise an arrester disposed aft of a leading edge of a nacelle inlet, a first plurality of webbings coupled between the arrester and an inner barrel of the nacelle inlet, and a second plurality of webbings coupled between the arrester and an outer barrel of the nacelle inlet, wherein at least one of the first plurality of webbings and the second plurality of webbings comprise a plurality of folds stitched together, at least one of the first plurality of webbings and the second plurality of webbings configured to gradually absorb energy from an object in response to the object engaging the arrester and the arrester configured to stop the object.

In various embodiments, a plurality of stitches may be configured to break in response to the energy being gradually absorbed. At least one of the first plurality of webbings and the second plurality of webbings may comprise at least one of nylon, aramid, ultra-high molecular weight polyethylene, and polyester.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
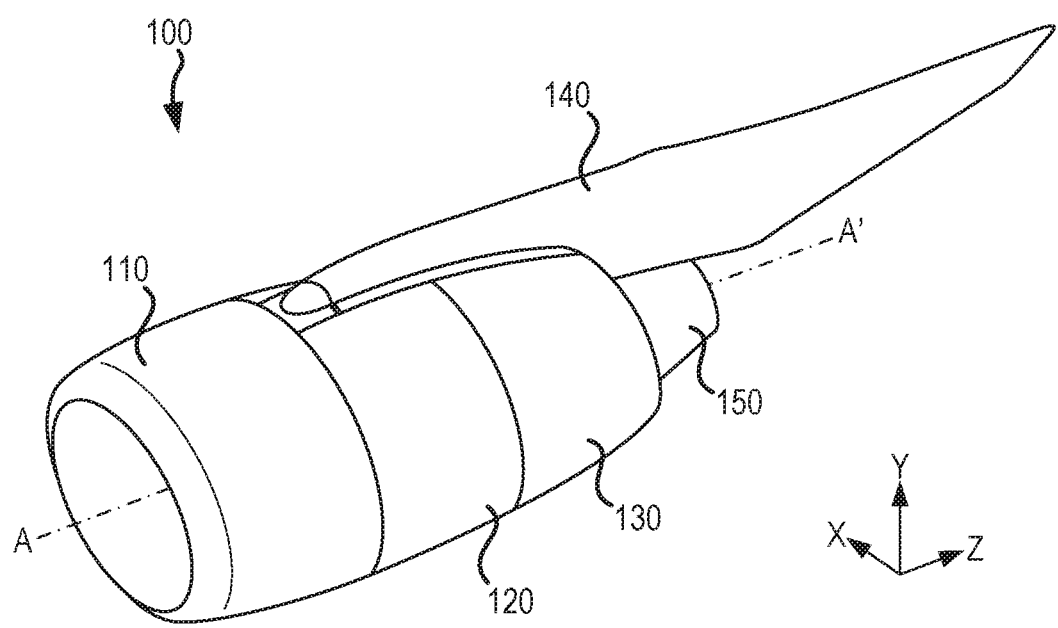
FIG. 1 illustrates a nacelle for a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Aircraft are susceptible to high velocity impact events caused by collision with birds, which may be referred to as "bird strikes." To reduce the damage and effects of bird strikes, certain parts or areas of aircraft are designed and/or sized to withstand a bird strike event to assure safety of flight.

One design of an anti-bird strike strategy with respect to an aircraft structure adopts a material cured to a leading edge skin of an aerostructure. However, cured plies of material may tear, abrade, or otherwise degrade, which may reduce the ability of the material to absorb a bird strike without failing. Furthermore, by directly coupling the material to the leading edge skin, the material becomes susceptible to challenging environmental conditions, such as temperature for example, of the skin. For example, a leading edge nose of a nacelle may receive heated air for de-icing purposes.

The present disclosure relates to an energy absorbing arrangement for stopping an object, such as a bird during a bird-strike event for example, from passing through an inlet of a turbine engine nacelle. The energy absorbing arrangement includes webbing coupled between an outer barrel and an inner barrel of an inlet. The webbing is offset from a forward bulkhead of the inlet. By offsetting the webbing from the forward bulkhead, the webbing is decoupled from the conditions of the forward bulkhead, such as heat generated by the de-ice air circulating within the nose lip of the inlet for example. The webbing includes a plurality of folds which are stitched together. Upon impact with a large object, such as a bird for example, the stitches break, thus absorbing energy from the large object until the webbing is unfolded at which point the energy absorbing arrangement fully stops the large object. In this regard, the large object is gradually slowed down, minimizing the peak load imparted to the inlet structure.

In various embodiments, energy absorbing arrangements, as described herein, may allow for thinner wall thickness of a leading edge nose lips and/or thinner wall thickness of a forward bulkhead of a nacelle inlet.

With reference to FIG. 1, a nacelle 100 for a gas turbine engine is illustrated according to various embodiments. Nacelle 100 may be suitable for an aircraft. Nacelle 100 may comprise a centerline A-A'. Nacelle 100 may comprise an inlet 110, a fan cowl 120, and a thrust reverser 130. Fan cowl 120 may comprise two halves pivotally mounted to pylon 140, via one or more hinges. In this regard, fan cowl 120 may comprise a first fan cowl (also referred to as a right-hand (RH) fan cowl) and a second fan cowl (also referred to as a left-hand (LH) fan cowl).

In various embodiments, an exhaust nozzle 150 may extend from a turbine engine mounted within nacelle 100. Nacelle 100 may be coupled to a pylon 140, which may mount the nacelle 100 to an aircraft wing or aircraft body.

Figure 2:
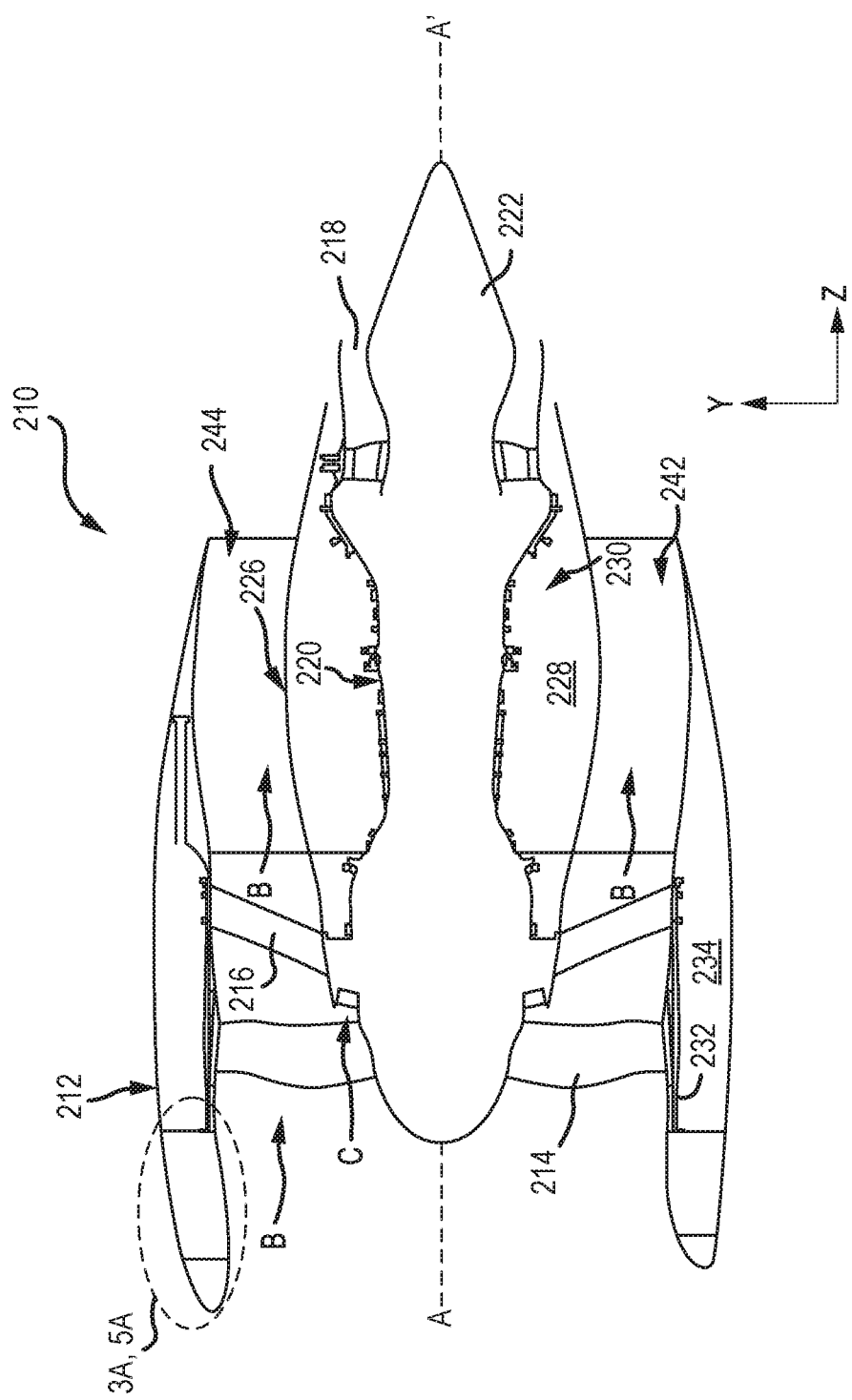
FIG. 2 illustrates a schematic view of a gas turbine engine within a nacelle, in accordance with various embodiments.

FIG. 2 illustrates a schematic view of a gas turbine engine within a nacelle, in accordance with various embodiments. XYZ-axes are provided for ease of illustration. Gas turbine engine 210 may include core engine 220. Core air flow C flows through core engine 220 and is expelled through exhaust outlet 218 surrounding tail cone 222.

Core engine 220 drives a fan 214 arranged in a bypass flow path B. Air in bypass flow-path B flows in the aft direction (z-direction) along bypass flow-path B. At least a portion of bypass flow path B may be defined by nacelle 212 and inner fixed structure (IFS) 226. Fan case 232 may surround fan 214. Fan case 232 may be housed within fan nacelle 212 and the annular compartment formed by the two is the fan compartment 234. Various components may be provided in fan compartment 234 such as fluid conduits, electrical wires, compressed air ducts, and/or electrical systems such as a full authority digital engine controller (FADEC). Fan 214 may rotate about an engine centerline axis A-A'.

Nacelle 212 typically comprises two halves which are mounted to a pylon. According to various embodiments, multiple guide vanes 216 may extend radially between core engine 220 and fan case 232. Upper bifurcation 244 and lower bifurcation 242 may extend radially between the nacelle 212 and IFS 226 in locations opposite one another to accommodate engine components such as wires and fluids, for example.

Inner fixed structure 226 surrounds core engine 220 and provides core compartments 228. Various components may be provided in core compartment 228 such as fluid conduits and/or compressed air ducts, for example.

Figure 3A:
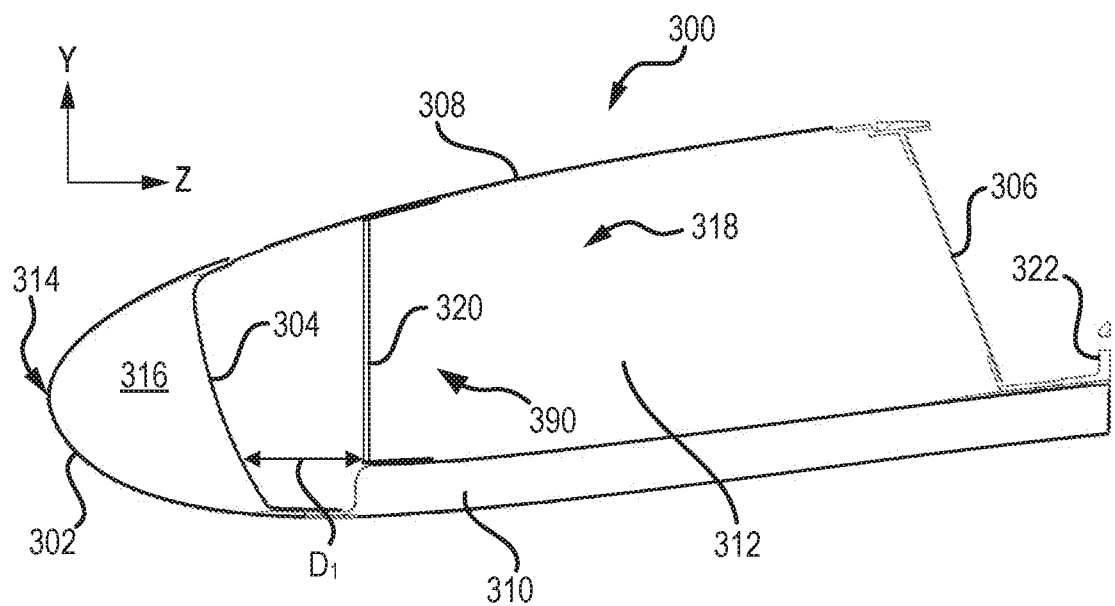
FIG. 3A illustrates a cross-sectional view of a nacelle inlet having an energy absorbing arrangement, in accordance with various embodiments.

With reference to FIG. 3A, a cross-sectional view of a nacelle inlet 300 is illustrated, in accordance with various embodiments. Nacelle inlet 300 may comprise an inner barrel 310, an attach flange 322, an outer barrel 308, a forward bulkhead 304, an aft bulkhead 306, and a nose lip 302. Inner barrel 310 may be disposed radially inward from outer barrel 308. In this regard, outer barrel 308 may encompass inner barrel 310. Outer barrel 308 may comprise a generally cylindrical panel. Inner barrel 310 may comprise a generally cylindrical panel. Forward bulkhead 304 may be coupled between inner barrel 310, nose lip 302, and outer barrel 308. Aft bulkhead 306 may be coupled between inner barrel 310 and outer barrel 308. A fan case, such as fan case 232 of FIG. 2 for example, may be coupled to attach flange 322. Outer barrel 308, inner barrel 310, forward bulkhead 304, and aft bulkhead 306 may define a cavity 312. Cavity 312 may be annular in geometry. Nose lip 302 may be coupled to forward bulkhead 304. Nose lip 302 may define a leading edge of nacelle inlet 300. In various embodiments, heated air may be circulated within cavity 316 defined between nose lip 302 and forward bulkhead 304 to tend to prevent ice from forming on nose lip 302.

In various embodiments, an energy absorbing arrangement 318 may be disposed within nacelle inlet 300. Energy absorbing arrangement 318 may be disposed within cavity 312 of nacelle inlet 300. Energy absorbing arrangement 318 may comprise a webbing 320 coupled between inner barrel 310 and outer barrel 308. Webbing 320 may be configured to absorb energy from an object in response to the object passing through the forward bulkhead 304 and applying a force to the webbing 320.

It is contemplated herein, that forward bulkhead 304 and/or aft bulkhead 306 may be omitted from nacelle inlet 300. In this regard, webbing 320 may be configured to absorb energy from an object in response to the object passing through the nose lip 302 and applying a force to the webbing 320. It is further contemplated herein, that instead of, or in addition to, forward bulkhead 304, stiffener ribs or other features may be present forward of webbing 320. In this regard, webbing 320 may be configured to absorb energy from an object in response to the object passing through nose lip 302 and/or any other features located forward of webbing 320.

Figure 3B:
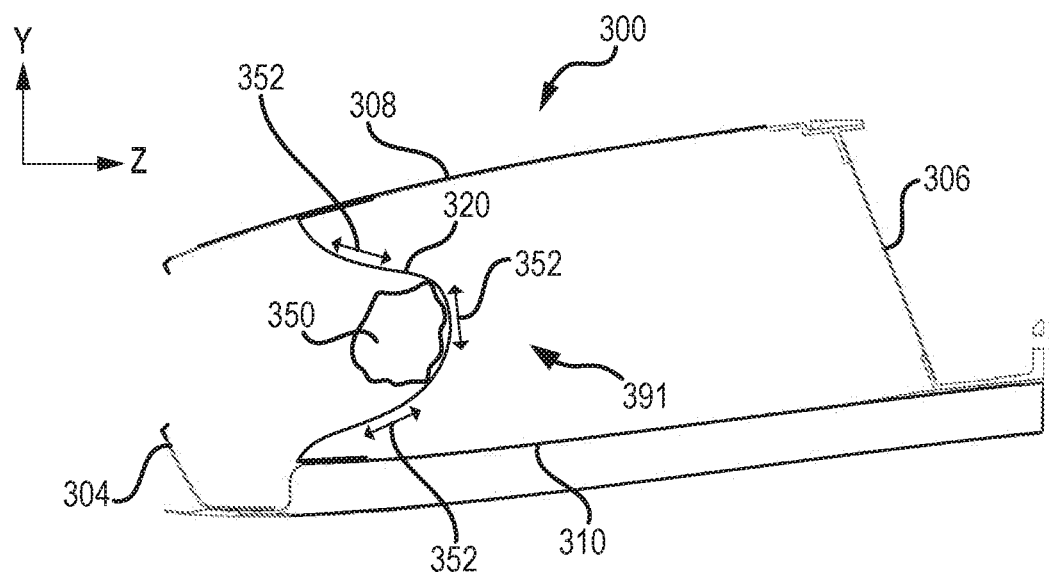
FIG. 3B illustrates the nacelle inlet having the energy absorbing arrangement of FIG. 3A during a bird-strike event, in accordance with various embodiments.

With reference to FIG. 3B, nacelle inlet 300 is illustrated during a bird-strike event, in accordance with various embodiments. FIG. 3B illustrates forward bulkhead 304 in a damaged state from object 350 having passed through forward bulkhead 304 during a bird-strike event. Webbing 320 may be configured to absorb energy from object 350 in response to object 350 passing through forward bulkhead 304 and/or nose lip 302 and applying a force 352 to webbing 320. In various embodiments, force 352 may comprise a tensile force. In various embodiments, webbing 320 may be configured to arrest object 350 in response to object 350 engaging webbing 320. In this regard, webbing 320 may prevent object 350 from reaching aft bulkhead 306 and/or fan compartment 234, with momentary reference to FIG. 2.

In various embodiments, webbing 320 may comprise nylon, aramid, ultra-high molecular weight polyethylene, and polyester, or any other suitable material.

In various embodiments, energy absorbing arrangement 318, and more particularly webbing 320, may be offset in the aft direction from forward bulkhead 304 by a distance $D_1$. In various embodiments, distance $D_1$ may be greater than 1 centimeter (0.39 inches), and in various embodiments, distance $D_1$ may be greater than 2.54 centimeters (1 inch). In this regard, energy absorbing arrangement 318 may be separated from a leading edge defined by nose lip 302 of nacelle inlet 300. Similarly, webbing 320 may be offset in the aft direction from nose lip 302.

Figure 4A:
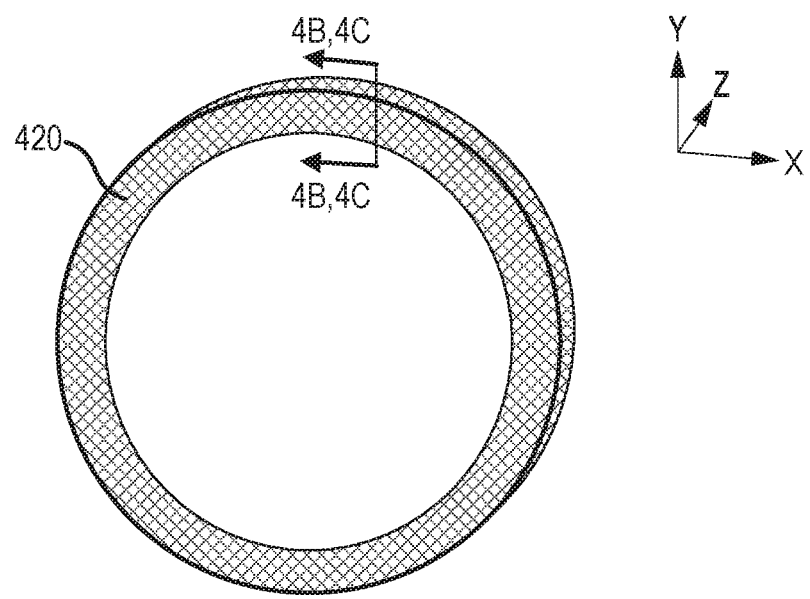
FIG. 4A illustrates a perspective view of a webbing, in accordance with various embodiments.

With reference to FIG. 4A, webbing 420 is illustrated, in accordance with various embodiments. In various embodiments, webbing 320 of FIG. 3A and FIG. 3B may be similar to webbing 420. Webbing 420 may comprise an annular geometry. In this regard, webbing 420 may extend around the circumference of a nacelle inlet, such as nacelle inlet 300 of FIG. 3A for example. In various embodiments, webbing 420 may comprise a single unitary member. In various embodiments, webbing 420 may be segmented.

Figures 4B, 4C:
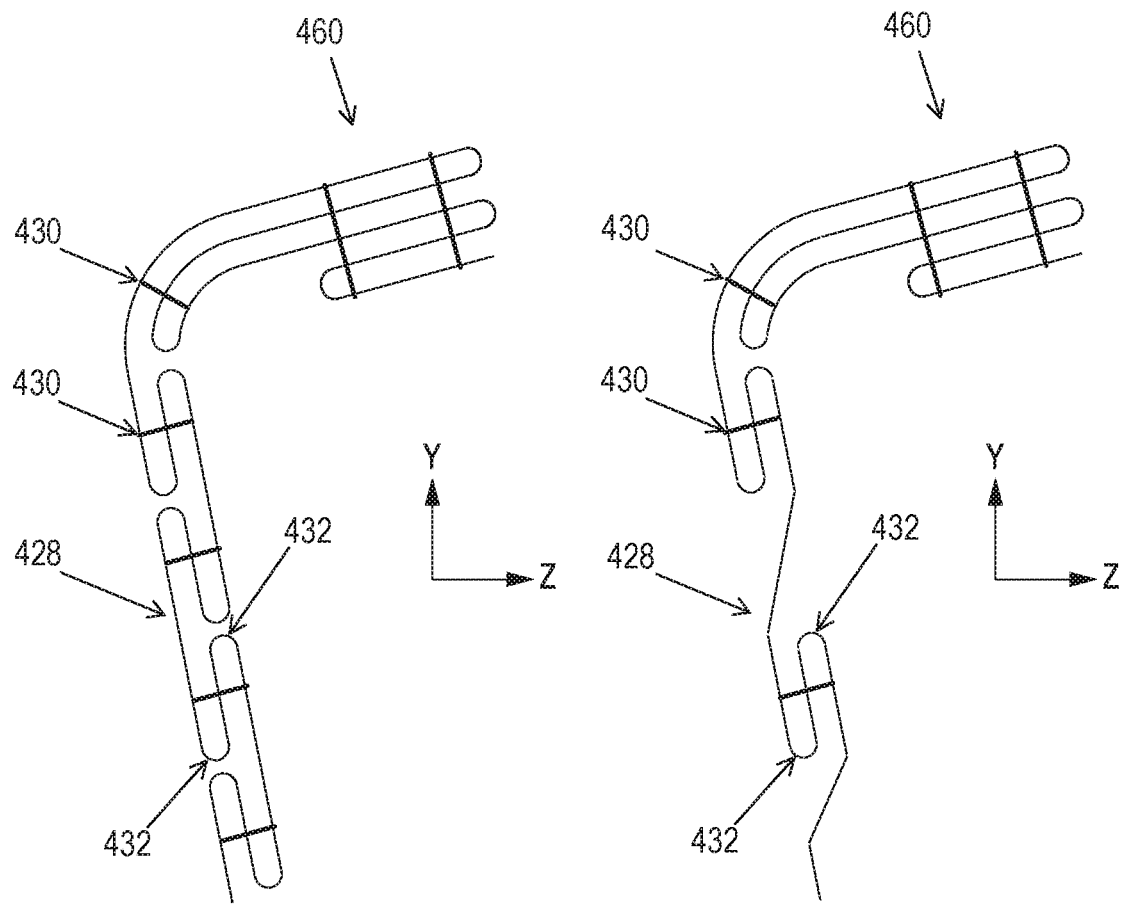
FIG. 4B and FIG. 4C illustrate cross-sectional views of a webbing having a plurality of folds and a plurality of stitches, and having a reinforcement zone for securing the webbing, in accordance with various embodiments.

With reference to FIG. 4B and FIG. 4C, webbing 420 may be folded in accordance with various embodiments. With combined reference to FIG. 3A, FIG. 4A, FIG. 4B, and FIG. 4C in the folded position 390, webbing 420 may comprise a plurality of folds 432. Plurality of folds 432 may be stitched together via a plurality of stitches 430 to hold material 428 of webbing 420 in the folded position 390. The plurality of folds 432 may be oriented relative to each other as illustrated in FIG. 4B. The plurality of folds 432 may be oriented relative to each other as illustrated in FIG. 4C. The plurality of folds 432 may be oriented in any suitable fashion such that the webbing 420 absorbs energy from the object engaging webbing 420 in response to the folds being unfolded as the stitches break under load from the object.

In this regard, with combined reference to FIG. 3B, FIG. 4B and FIG. 4C, as object 350 imparts a force onto webbing 320, plurality of stitches 430 may begin to break and the plurality of folds 432 may begin to unfold as the respective stitches are broken. During the breaking and unfolding process of the stitches and folds, respectively, webbing 320 may gradually absorb energy from object 350. In this regard, the peak load imparted onto nacelle inlet 300 may be mitigated. In various embodiments, object 350 may impart a tensile force onto webbing 320. In this regard, plurality of stitches 430 may break in response to a tensile force being applied to material 428. Webbing 320 may gradually unfold until it reaches a fully unfolded position 391 where it completely stops object 350. However, in various embodiments, webbing 320 may completely stop object 350 before reaching a completely unfolded position, for example webbing 320 may stop object 350 after having only been partly unfolded depending on the total force applied by object 350.

Figure 7:
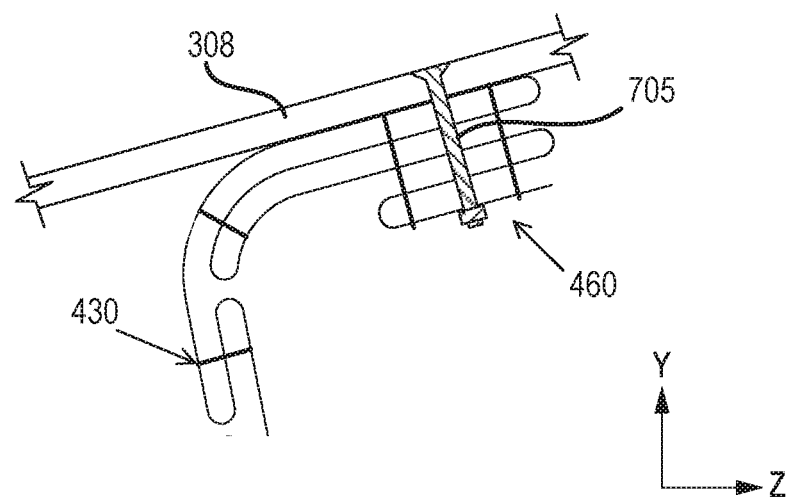
FIG. 7 illustrates a cross-sectional view of the reinforcement zone of FIG. 4B and FIG. 4C attached to an outer barrel via a fastener, in accordance with various embodiments.

With combined reference to FIG. 4A and FIG. 4B, webbing 420 may comprise a reinforcement zone 460. Reinforcement zone 460 may extend in an axial direction (i.e., the Z-direction). Webbing 420 may be attached to outer barrel (e.g., outer barrel 308 of FIG. 3A) at reinforcement zone 460. Webbing 420 may be similarly attached to inner barrel (e.g., inner barrel 310 of FIG. 3A) at a reinforcement zone 460 located on the opposite end of webbing 420. In various embodiments, webbing 420 may be attached to outer barrel 308 at reinforcement zone 460 by a fastener 705 as illustrated in FIG. 7. Similarly, webbing 420 may be attached to inner barrel 310 at a reinforcement zone 460 located on the opposite end of webbing 420. Fastener 705 may extend through webbing 420 at reinforcement zone 460.

Figure 5A:
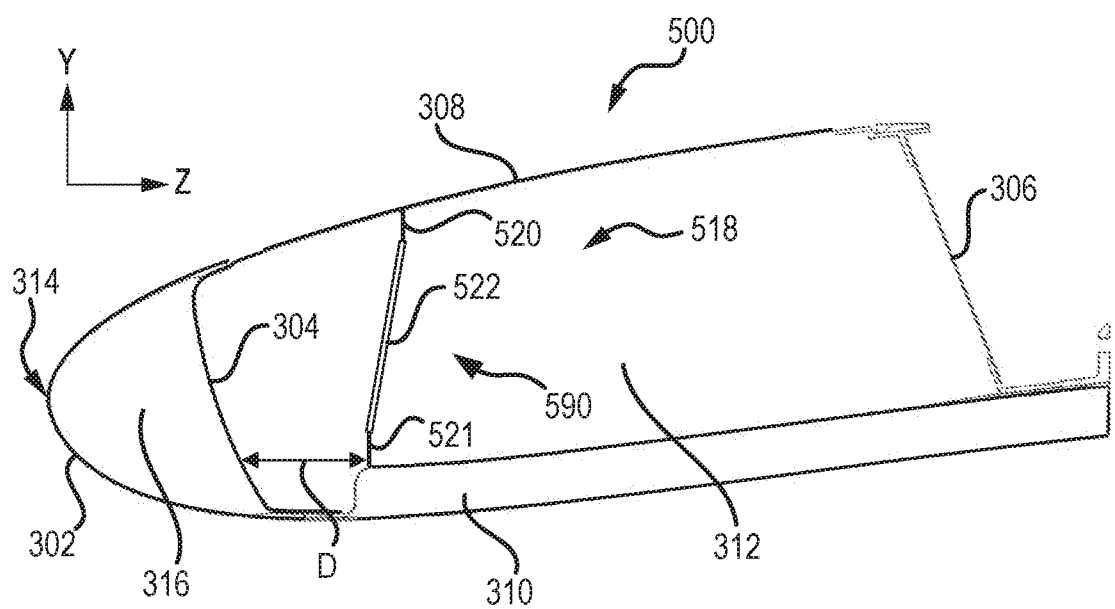
FIG. 5A illustrates a cross-sectional view of a nacelle inlet having an energy absorbing arrangement, in accordance with various embodiments.
Figure 5B:
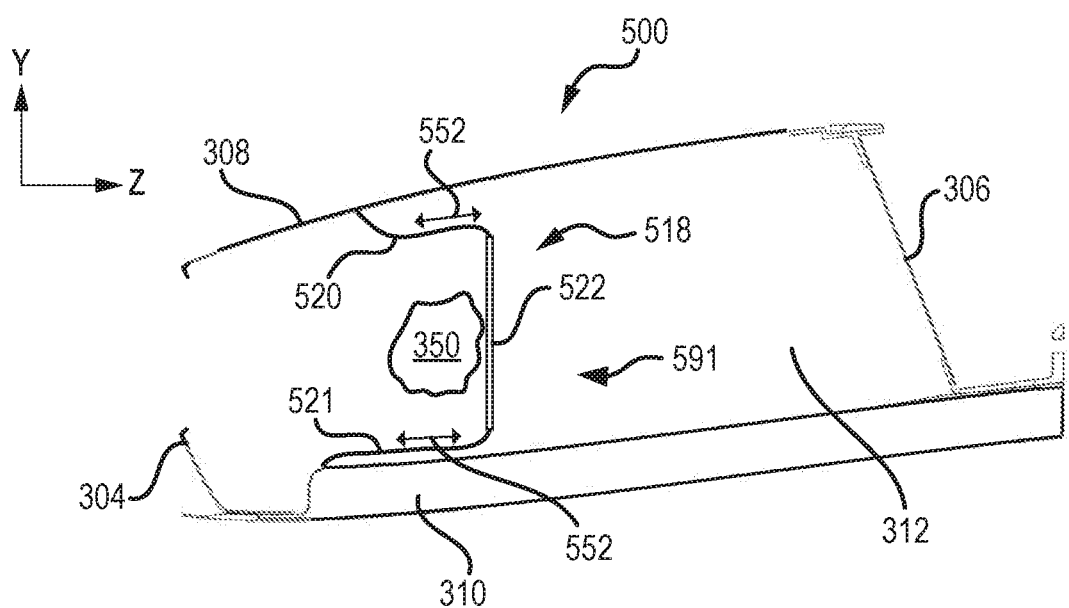
FIG. 5B illustrates the nacelle inlet having the energy absorbing arrangement of FIG. 5A during a bird-strike event, in accordance with various embodiments.

With respect to FIG. 5A and FIG. 5B, elements with like element numbering, as depicted in FIG. 3A, are intended to be the same and will not necessarily be repeated for the sake of clarity.

With reference to FIG. 5A, a cross-sectional view of a nacelle inlet 500 is illustrated, in accordance with various embodiments. Nacelle inlet 500 may be similar to nacelle inlet 300 of FIG. 3A.

In various embodiments, an energy absorbing arrangement 518 may be disposed within nacelle inlet 500. Energy absorbing arrangement 518 may be disposed within cavity 512 of nacelle inlet 500. Energy absorbing arrangement 518 may comprise a webbing 520 coupled between inner barrel 310 and outer barrel 308. Webbing 520 may be configured to absorb energy from an object in response to the object passing through the forward bulkhead and/or nose lip and applying a force to the webbing. Furthermore, energy absorbing arrangement 518 may further comprise an arrester 522 and a webbing (also referred to herein as an additional webbing) 521. In various embodiments, webbing 520 may be similar to webbing 320 of FIG. 3A. Webbing 521 may be similar to webbing 520.

In various embodiments, webbing 520 may be coupled between outer barrel 308 and arrester 522. Arrester 522 may be coupled between webbing 520 and webbing 521. Webbing 521 may be coupled between inner barrel 310 and arrester 522. Webbing 520 and/or webbing 521 may absorb energy from an object during an impact event and arrester 522 may stop the object and prevent the object from reaching aft bulkhead 306 and fan compartment 234.

With reference to FIG. 5B, nacelle inlet 500 is illustrated during a bird-strike event, in accordance with various embodiments. FIG. 5B illustrates forward bulkhead 304 in a damaged state from object 350 having passed through forward bulkhead 304 during a bird-strike event. Webbing 520 and/or webbing 521 may be configured to absorb energy from object 350 in response to object 350 passing through forward bulkhead 304 and/or nose lip 302 and applying a force 552 to webbing 520 and webbing 521. In various embodiments, force 552 may comprise a tensile force. In various embodiments, arrester 522 may be configured to arrest object 350 in response to object 350 engaging arrester 522. In this regard, arrester 522 may prevent object 350 from traveling after of arrester 522.

Figure 6:
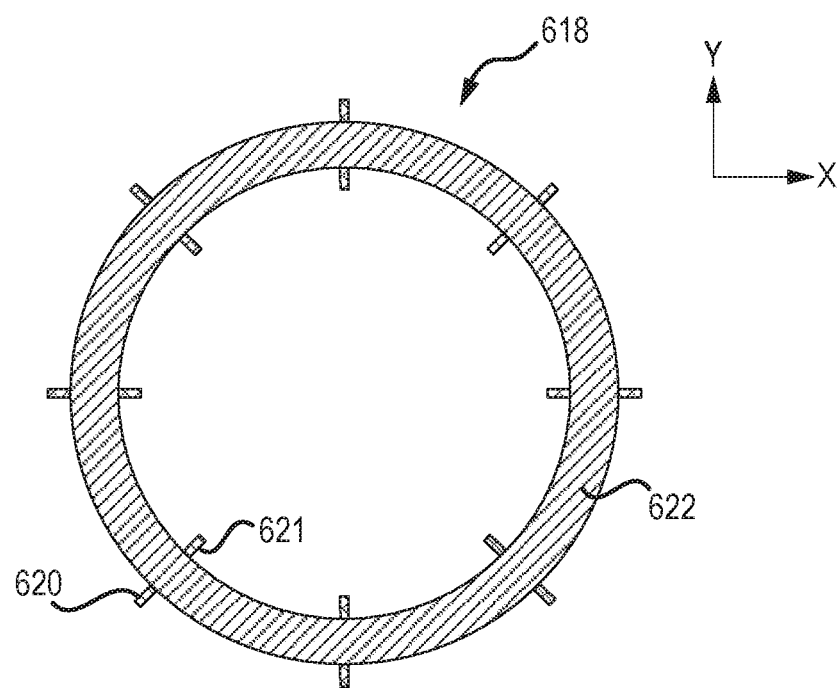
FIG. 6 illustrates an axial view of an energy absorbing arrangement having a first plurality of discrete webbings, a second plurality of discrete webbing, and an arrester, in accordance with various embodiments.

With reference to FIG. 6, an axial view of energy absorbing arrangement 618 is illustrated, in accordance with various embodiments. In various embodiments, energy absorbing arrangement 518 of FIG. 5A may be similar to energy absorbing arrangement 618. Arrester 622 may comprise an annular geometry. In various embodiments, arrester 622 may comprise a single unitary member. In various embodiments, arrester 622 may be segmented. In various embodiments, arrester 622 may comprise a metal panel. In various embodiments, arrester 622 may comprise a composite panel. In various embodiments, arrester 622 may comprise a fabric net.

In various embodiments, arrester 622 may be coupled to inner barrel 310 (see FIG. 5A) via a plurality of discrete webbings (also referred to herein as a first plurality of webbings) 621. Webbing 521 of FIG. 5A may be similar to webbing 621. Webbing 621 may comprise a strap. Webbing 621 may comprise a plurality of folds and stitches as described with reference to FIG. 4B and FIG. 4C. In this regard webbing 621 may absorb energy in response to an impact event such as a bird strike.

In various embodiments, arrester 622 may be coupled to outer barrel 308 (see FIG. 5A) via a plurality of discrete webbings (also referred to herein as a second plurality of webbings) 620. Webbing 520 of FIG. 5A may be similar to webbing 620. Webbing 620 may comprise a strap. Webbing 620 may comprise a plurality of folds and stitches as described with reference to FIG. 4B and FIG. 4C. In this regard webbing 620 may absorb energy in response to an impact event such as a bird strike. In various embodiments, webbing 620 and/or webbing 621 may be coupled to outer barrel 308 and inner barrel 310, respectively via a fastener as described with reference to FIG. 7.

Although illustrated as comprising eight webbings 621 and eight webbing 620, energy absorbing arrangement 618 may comprise any number of webbings 621 and webbings 620. In various embodiments, the number of webbings 621 and webbings 620 may be tuned to provide gradual absorption of energy in response to an impact event.

In various embodiments, webbing 621 and/or webbing 620 may comprise nylon, aramid, ultra-high molecular weight polyethylene, and polyester, or any other suitable material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy absorbing arrangement of an aircraft nacelle inlet, comprising:
   an inner barrel comprising a centerline axis;
   an outer barrel;
   a nose lip extending between the inner barrel and the outer barrel; and
   a webbing disposed aft of the nose lip, the webbing extending between the outer barrel and the inner barrel and configured to be offset from the nose lip by a distance, the webbing being folded together to form a plurality of folds, the plurality of folds being stitched together via a plurality of stitches,
   wherein the webbing is configured to absorb energy from an object and arrest the object in response to the object passing through the nose lip and applying a force to the webbing, and
   at least one stitch of the plurality of stitches is configured to break, and at least one fold of the plurality of folds is configured to unfold, in response to the force being applied to the webbing.

2. The energy absorbing arrangement of claim 1, further comprising:
   a forward bulkhead extending between the inner barrel and the outer barrel; and
   an aft bulkhead extending between the inner barrel and the outer barrel.

3. The energy absorbing arrangement of claim 1, wherein the force comprises a tensile force.

4. The energy absorbing arrangement of claim 1, wherein the distance is greater than 1 centimeter (0.39 inches).

5. The energy absorbing arrangement of claim 1, wherein the webbing is configured to arrest the object in response to the object engaging the webbing.

6. The energy absorbing arrangement of claim 5, wherein the webbing comprises a reinforcement zone at an end of the webbing whereby the webbing is fastened to the outer barrel.

7. The energy absorbing arrangement of claim 6, wherein the webbing comprises an additional reinforcement zone at another end of the webbing whereby the webbing is fastened to the inner barrel.

8. A nacelle for an aircraft, comprising:
   an inlet disposed forward of a fan case, comprising:
     an inner barrel comprising a centerline axis;
     an outer barrel; and
     a nose lip extending between the inner barrel and the outer barrel; and
   an energy absorbing arrangement comprising:
     a webbing extending between the outer barrel and the inner barrel and offset from the nose lip by a distance, the webbing being folded together to form a plurality of folds, the plurality of folds being stitched together via a plurality of stitches,
     wherein the webbing is configured to absorb energy from an object and arrest the object in response to the object applying a force to the webbing, and
     at least one stitch of the plurality of stitches is configured to break, and at least one fold of the plurality of folds is configured to unfold, in response to the force being applied to the webbing.

9. The nacelle of claim 8, further comprising:
   a forward bulkhead extending between the inner barrel and the outer barrel; and
   an aft bulkhead extending between the inner barrel and the outer barrel.

10. The nacelle of claim 8, wherein the force comprises a tensile force.

11. The nacelle of claim 8, wherein the webbing is configured to arrest the object in response to the object engaging the webbing.

12. The nacelle of claim 11, wherein the webbing comprises a reinforcement zone at an end of the webbing whereby the webbing is fastened to at least one of the outer barrel and the inner barrel.

13. An energy absorbing arrangement of an aircraft, comprising:
   an arrester disposed aft of a leading edge of a nacelle inlet, the arrester comprising an annular geometry;
   a first plurality of webbings coupled between the arrester and an inner barrel of the nacelle inlet; and
   a second plurality of webbings coupled between the arrester and an outer barrel of the nacelle inlet,
   wherein at least one of the first plurality of webbings and the second plurality of webbings comprise a plurality of folds stitched together, at least one of the first plurality of webbings and the second plurality of webbings configured to gradually absorb energy from an object in response to the object engaging the arrester and the arrester configured to stop the object.

14. The energy absorbing arrangement of claim 13, wherein a plurality of stitches are configured to break in response to the energy being gradually absorbed.

15. The energy absorbing arrangement of claim 13, wherein at least one of the first plurality of webbings and the second plurality of webbings comprises at least one of nylon, aramid, ultra-high molecular weight polyethylene, and polyester.

16. The energy absorbing arrangement of claim 13, wherein the arrester comprises at least one of a fabric net, a metal panel, and a composite panel.

* * * * *